US007096743B2

(12) United States Patent
Vogel et al.

(10) Patent No.: US 7,096,743 B2
(45) Date of Patent: Aug. 29, 2006

(54) DEVICE FOR MEASURING THE BENDING STRENGTH OF FLAT CONSIGNMENTS

(75) Inventors: Rainer Vogel, Constance (DE); Erich Groegor, Constance (DE); Armin Zimmermann, Constance (DE)

(73) Assignee: Siemens Aktiengesellschaft, Munich (DE)

( * ) Notice: Subject to any disclaimer, the term of this patent is extended or adjusted under 35 U.S.C. 154(b) by 57 days.

(21) Appl. No.: 10/496,856

(22) PCT Filed: Sep. 26, 2003

(86) PCT No.: PCT/DE03/03220

§ 371 (c)(1),
(2), (4) Date: May 27, 2004

(87) PCT Pub. No.: WO2004/030835

PCT Pub. Date: Apr. 15, 2004

(65) Prior Publication Data

US 2005/0000299 A1 Jan. 6, 2005

(30) Foreign Application Priority Data

Sep. 27, 2002 (DE) ................................ 102 45 358

(51) Int. Cl.
*G01N 3/20* (2006.01)

(52) U.S. Cl. .......................................... 73/849; 73/159

(58) Field of Classification Search .................. 73/849, 73/159

See application file for complete search history.

(56) References Cited

U.S. PATENT DOCUMENTS 4,030,607 A * 6/1977 Suda et al. ................. 209/555
4,360,108 A 11/1982 Logothetis .................. 209/598
4,924,652 A * 5/1990 Krasuski et al. ............... 53/55
4,953,842 A 9/1990 Tolmie, Jr. et al. ............. 271/2
5,171,403 A 12/1992 Chase et al. ................ 162/197
5,182,722 A 1/1993 Hain ..................... 364/551.01
5,201,424 A 4/1993 Hain .......................... 209/534
5,297,062 A 3/1994 Cresson et al. ............. 364/564
5,328,163 A * 7/1994 Yamada ................... 271/10.01
5,358,464 A * 10/1994 Funk et al. ................. 493/320
5,637,811 A 6/1997 Simard et al. ............. 73/865.8
5,683,190 A * 11/1997 Gawler ....................... 400/582
5,704,246 A 1/1998 Kruger ........................ 73/159
5,914,464 A * 6/1999 Vogel ......................... 177/145
5,934,140 A 8/1999 Jackson et al. ............... 73/159
6,026,681 A 2/2000 Wunderer et al. ............ 73/159
6,032,517 A 3/2000 Reisig et al. .................. 73/78

(Continued)

FOREIGN PATENT DOCUMENTS

DE 1 574 164 12/1967

(Continued)

*Primary Examiner*—Max Noori
(74) *Attorney, Agent, or Firm*—Philip G. Meyers

(57) ABSTRACT

An apparatus for measuring the flexural rigidity in the longitudinal direction of flat items of mail transported one after another on a conveying path includes a control device, a sensor for detecting the edges of the items of mail and signaling the control device when a mail item reaches a selected bearing point, a deflection apparatus that moves into the conveying path under the control of the control device to bend individual mail items and means for determining one or both of the magnitude of the deflection of the items of mail and the magnitude of the deflection force, the control device progressing signals from one or both of the sensor and measuring means to determine the flexural rigidity of the mail item.

14 Claims, 6 Drawing Sheets

U.S. PATENT DOCUMENTS

| | | | | |
|---|---|---|---|---|
| 6,135,292 | A | 10/2000 | Pettner | 209/603 |
| 6,141,883 | A * | 11/2000 | Mitchell et al. | 33/501.02 |
| 6,571,958 | B1 * | 6/2003 | Malatesta et al. | 209/643 |
| 6,655,683 | B1 | 12/2003 | Engarto et al. | 271/265 |
| 6,897,394 | B1 * | 5/2005 | Dibiaso et al. | 209/584 |
| 2003/0071200 | A1 * | 4/2003 | Francke | 250/221 |
| 2003/0115161 | A1 * | 6/2003 | Cordery et al. | 705/402 |
| 2004/0113358 | A1 | 6/2004 | Engarto et al. | 271/262 |

FOREIGN PATENT DOCUMENTS

| | | | |
|---|---|---|---|
| DE | 196 00 231 | C2 | 2/1998 |
| EP | 0 829 720 | A1 | 9/1997 |
| EP | 8 41 554 | A2 | 11/1997 |

* cited by examiner

DEVICE FOR MEASURING THE BENDING STRENGTH OF FLAT CONSIGNMENTS

The invention relates to an apparatus for measuring the flexural rigidity in the longitudinal direction of flat items of mail which are transported one after another on a conveying path.

For the processing of flat items of mail in automatic sorting systems, it is necessary to measure the rigidity of the items of mail in advance, since the machine capability of the items of mail depends to a great extent on the rigidity of the items of mail. Items of mail with too rigid a content can lead to damage to sorting system and item of mail, for which reason they must be identified and separated in advance.

The more accurately the rigidity of the items of mail can be determined, the lower is the number of damaged items of mail and the less is the damage to the machine.

In the known solutions, the items of mail pass through a curved section of the conveying path, designed as a cover belt system, in which the deflection of the items of mail is measured. If the items of mail have a low flexural rigidity in the longitudinal direction, then they nestle against the deflection element and virtually no deflection takes place. In the case of a higher longitudinal rigidity, the front and rear parts of the rigid sections are deflected in a corresponding manner.

In DE-A 15 74 164, this deflection is sensed by means of a sprung roller. However, these rollers are susceptible to oscillation and therefore tend to overswing, which reduces the accuracy of the measured results. An increasing thickness of the item of mail has the effect of an increasing impact against the sprung roller or against the front edge of the item of mail, which, in an amplified manner, can lead to overswinging of the roller and to undesired displacements of the items of mail with respect to one another.

In order to avoid these disadvantages, one solution is known (DE 196 00 231 C2), in which the deflection is measured without contact by means of distance sensors, taking account of the thicknesses of the items of mail.

In both cases, the determination of the rigidity profile over the length of the items of mail is not possible.

Furthermore, in EP 0 829 720 A1, an apparatus for measuring the flexural rigidity of a moving sheet material web is described, in which the material web is guided over two deflection rollers and the material web is deflected by a deflection roller arranged between them. As the material web passes through, it is deflected by a specific constant amount. The force acting on the deflection roller in the process is measured continuously over the web length and, from this, the flexural rigidity is then determined, still further measures being taken to eliminate the influence of the web tension (additional periodic deflection of the material web by a small amount).

A solution has also been disclosed for the online measurement of the rigidity of panels, in particular wooden panels (EP 841 554 A2), in which a deflection apparatus provided with a roller presses with a specific force on the moving panels and the deflection represents a measure of the rigidity. Panels with considerable differences in thickness cannot be measured operationally reliably and sufficiently accurately with this.

The invention is based on the object of providing an apparatus for measuring the flexural rigidity in the longitudinal direction of flat items of mail which are transported one after another on a conveying path, which measures the flexural rigidity in the longitudinal direction of items of mail of different format and different thickness with high accuracy and which also permits the measurement of the flexural rigidity over the length of the item of mail.

According to the invention, the object is achieved by an apparatus having the features of claim 1.

In order to eliminate the influence of the thickness of the item of mail during the measurement and in order to avoid mechanical stress on the items of mail and the deflection apparatus, there is on the conveying path a measuring device, connected to the control device, for determining the thickness of each item of mail. The deflection apparatus, in the nondeflected state, and/or the bearing points for each item of mail are moved before the start of the respective rigidity measurement such that their distance perpendicular to the transport direction corresponds approximately to the respective thickness of the item of mail.

Advantageous refinements of the invention are described in the subclaims. For example, it is advantageous if the control device is designed such that the deflection apparatus remains in the deflected state until the rear edge of the item of mail has left the rearmost bearing point, and the rigidity trend is determined over the length of each item of mail.

It is also advantageous if the control device is designed such that only in the event of an inadmissible flexural rigidity measured over a defined length is a separation signal for this item of mail triggered. As a result, items of mail with stiff content of short length can pass through the sorting system, since only beginning at a specific length of the excessively rigid content will damage be caused to the items of mail or to the sorting machines.

The measuring means for determining the magnitude of the deflection of the items of mail is beneficially arranged at the level of the movable deflection apparatus. In order to detect items of mail with a bound edge and its position, it is advantageous additionally to provide a measuring means for determining the magnitude of the deflection of the items of mail at a different height of the items of mail, and to design the control device such that, in the event of nonuniform deflections determined by the two measuring means, it detects an item of mail with a bound edge and identifies as a bound edge that edge of the item of mail to which the measuring means with the lower deflection is closest.

In order that no disruptive frictional forces act on the moving items of mail during the measurement, the bearing points and the part of the deflection apparatus that touches the items of mail are designed as rollers.

The measuring means for determining the magnitude of the deflection are advantageously designed as distance sensors for a noncontact measurement.

Next, the invention will be explained in more detail in an exemplary embodiment and by using the drawings, in which.

Figure 1:
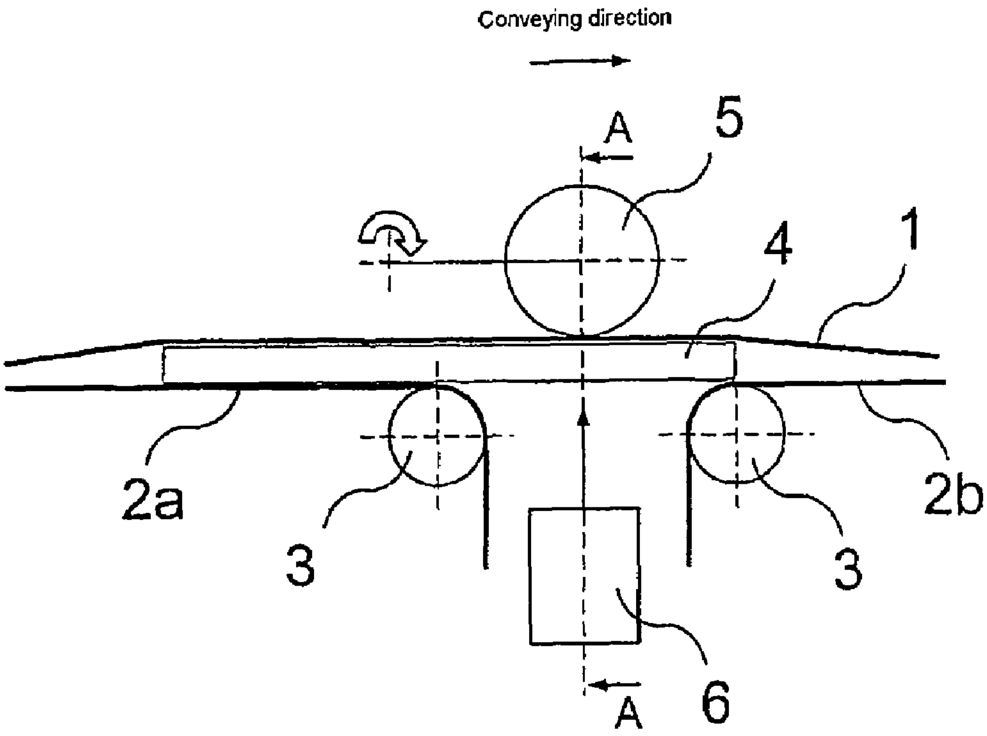
FIG. 1 shows a schematic plan view of a measuring apparatus with measurement of the deflection and with two bearing points in the rest position and a distance sensor.
Figure 2:
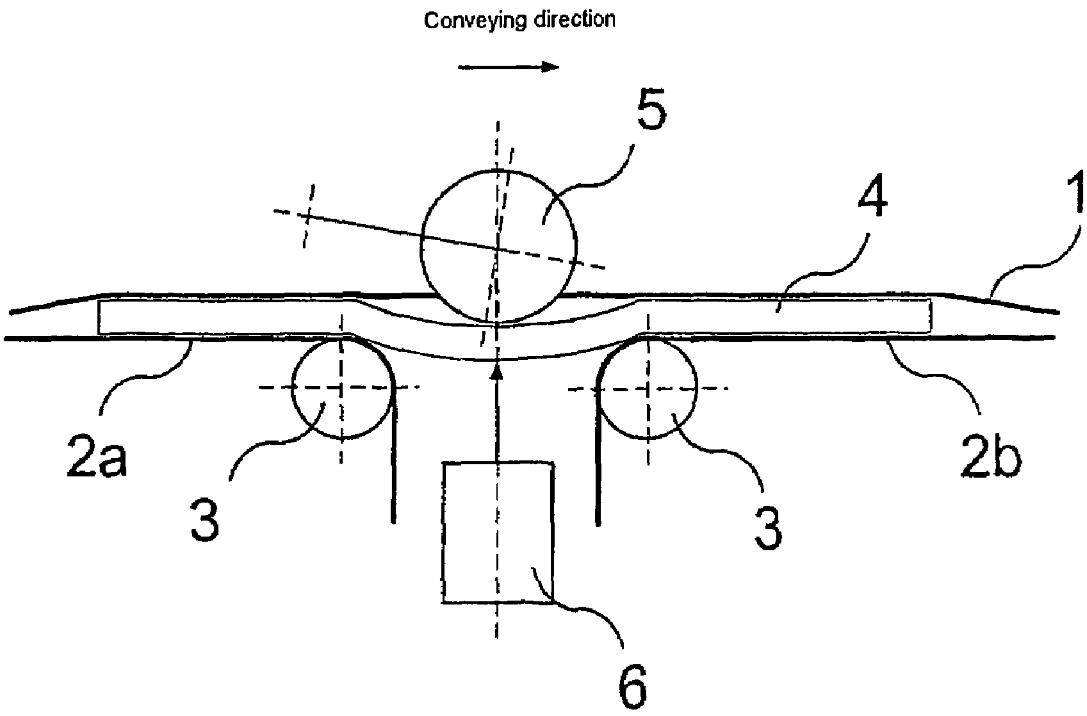
FIG. 2 shows a schematic plan view of a measuring apparatus with measurement of the deflection and with two bearing points and a distance sensor in the measuring position (deflected state)
Figure 3:
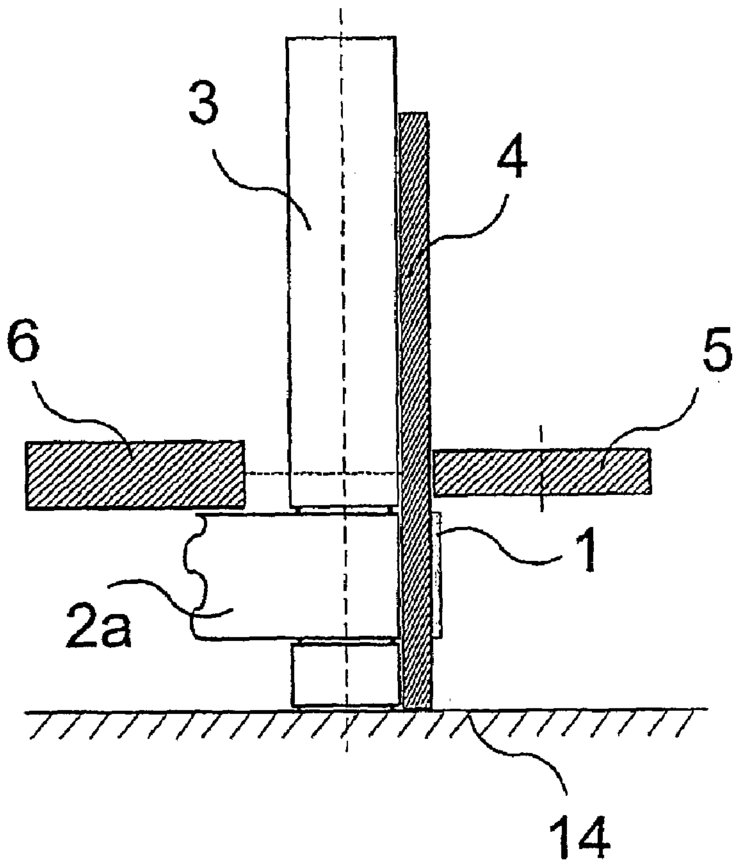
FIG. 3 shows a schematic side view of the measuring apparatus according to FIG. 1.

As illustrated in FIGS. 1 to 3, the items of mail 4 are transported on the conveying path in an upright position, clamped in between narrow transport belts 1, 2 of a cover belt system. In a straight section, there is the device for measuring the rigidity of the items of mail in the longitudinal direction. In this case, the transport belt 2 is divided into two part belts 2*a*, 2*b* at two spaced-apart, physically fixed supporting rollers 3 for supporting the items of mail 4 over their entire height. Between the two supporting rollers 3, which serve as bearing points during the measurement, there is on the other side of the cover belt system, that is to say on the transport belt 1, a deflection apparatus 5 which can be moved into the conveying path and which, during the deflection, contacts the items of mail 4 with a roller. The roller is moved forward and back appropriately by means of an actuator, for example a servomotor. Between the two part transport belts 2*a* and 2*b*, opposite the roller of the deflection apparatus 5 and at the level of the latter, there is a measuring means 6 for determining the magnitude of the deflection. This measuring means is designed as a laser distance sensor. Since the supporting rollers 3 are physically fixed and therefore items of mail 4 have a defined position there, the transport belt 1 is lifted off the supporting rollers 3 in a manner corresponding to the thickness of the item of mail. In order that items of mail 4 running in do not strike the roller of the deflection apparatus 5, the roller is preadjusted by the actuator in accordance with the respective thickness of the item of mail, which has previously been determined by means of a thickness measuring device, not illustrated, in such a way that the distance of the roller of the deflection apparatus 5 from the connecting straight line between the part belts 2*a* and 2*b* as the item of mail passes the deflection apparatus 5 corresponds approximately to the thickness of the item of mail. Using a light barrier, likewise not illustrated, the front and rear edges of the item of mail are detected. Since the transport speed of the cover belt system is known, the position of each item of mail 4, including the length of the item of mail, is also known at every time.

After the front edge of the respective item of mail 4 has reached the foremost bearing point/supporting roller 3 in the transport direction, the roller of the deflection apparatus 5 is deflected into the conveying path with a defined constant force, and therefore the item of mail 4 is bent. This bending is measured with the laser distance sensor and characterizes the rigidity of the item of mail.

Figure 4:
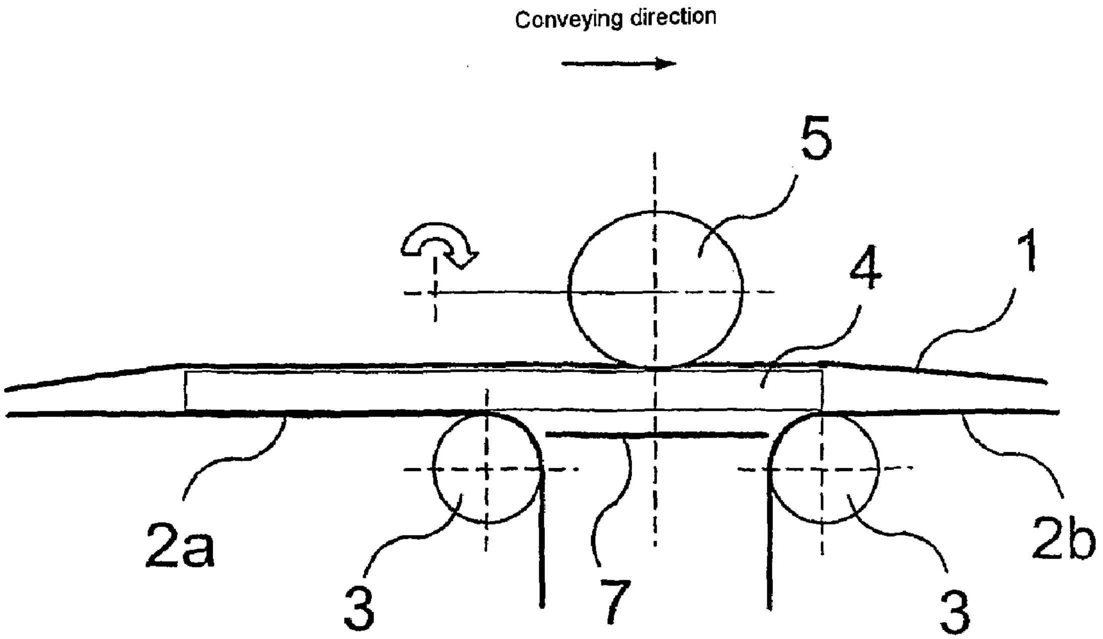
FIG. 4 shows a schematic plan view of a measuring apparatus with force measurement and with two bearing points in the rest position.
Figure 5:
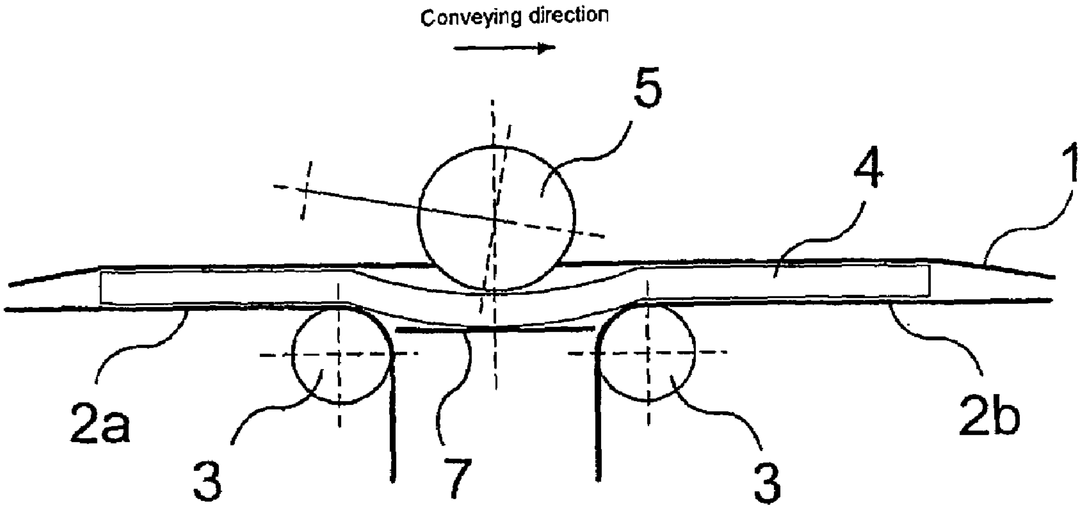
FIG. 5 shows a schematic plan view of a measuring apparatus with force measurement and with two bearing points in the measuring position (deflected state)

A measure of the rigidity of the item of mail can also be determined if, as can be seen from FIGS. 4 and 5, the items of mail 4 are deflected by a constant distance, and the force necessary for this, which is determined in the actuator controller, is used as a measure of the rigidity of the item of mail. In order to implement the constant distance, there is on a stop 7 a switch, whose switching element is actuated by the item of mail and, as a result, switches off the actuator drive of the deflection apparatus. This ensures that only the force necessary to bend the item of mail is determined.

The measurement is carried out until the rear edge of the item of mail 4 has left the rear supporting roller 3 in the transport direction. As a result, a corresponding rigidity trend is obtained, with which it is better possible to decide whether the respective item of mail 4 can be processed without disruption in a sorting machine.

In this case, the level of the flexural rigidity over a short length is not particularly dangerous but, because of the many deflections in the sorting machine, the inadmissible flexural rigidity over a greater length.

Figure 6:
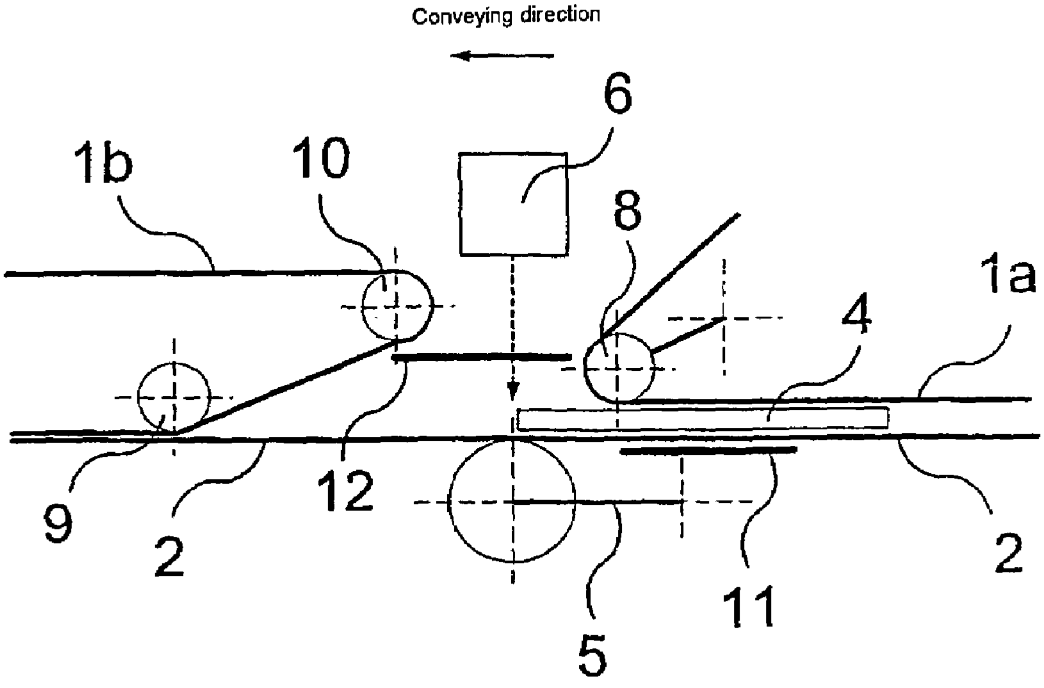
FIG. 6 shows a schematic plan view of a measuring apparatus with measurement of the deflection and with one bearing point in the rest position.
Figure 7:
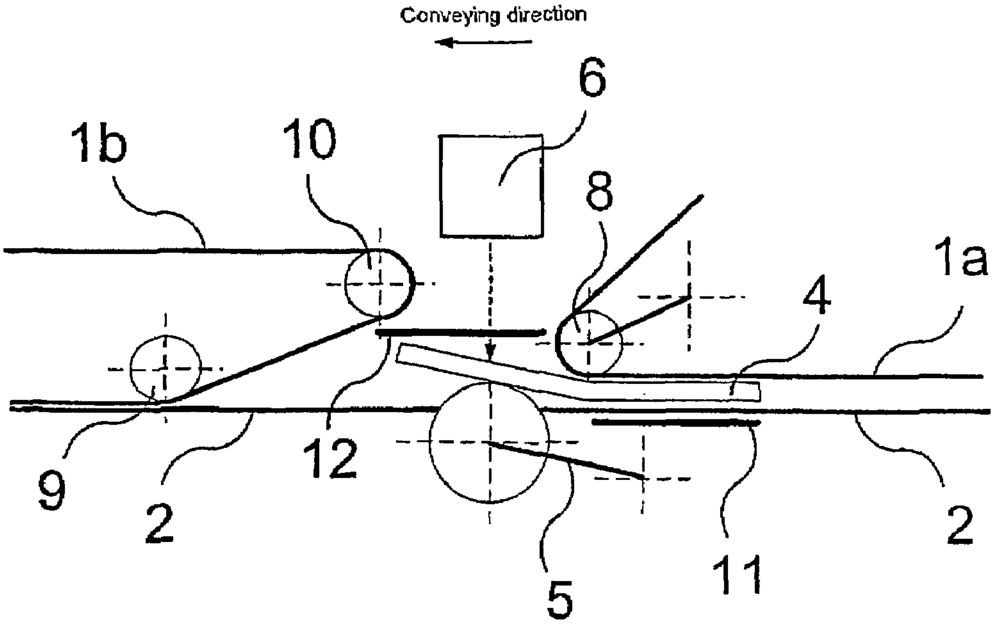
FIG. 7 shows a schematic plan view of a measuring apparatus with measurement of the deflection and with one bearing point in the measuring position (deflected state)

If it is necessary to measure the flexural rigidity in the longitudinal direction of very short items of mail 4 which are smaller than or equal to the distance between the two bearing points, then, during the measurement, at one bearing point the items of mail 4 are clamped in on one side using a supporting roller 8 and a guide surface 11 (FIG. 6 and FIG. 7). In this case, on the incoming part of the measuring arrangement, a defined position of the transport belt 2 passing through is ensured by the smooth guide surface 11 or by guide rollers. The deflection apparatus 5 with the roller at the end is located on the side of the transport belt 1, and the other belt strand is subdivided into two parts, transport belts 1*a*and 1*b*. The transport belt la is deflected at a supporting roller 8 on the incoming part, the roller being moved approximately perpendicular to the transport direction in accordance with the measured thickness of the item of mail. (Thickness of item of mail=distance between supporting roller 8 and guide surface 11). As soon as the front edge of the incoming item of mail 4 has reached the roller of the deflection apparatus 5, the deflection of the roller with a defined constant force into the conveying path, and therefore the bending of the item of mail 4 over the supporting roller 8, are carried out. In order that the items of mail 4 remain in the conveying channel, before the supporting roller 8 in the transport direction there is a guide plate 12, which prevents thin items of mail 4 with a low flexural rigidity leaving the measuring apparatus outward at the relatively high transport speed and causing a disruption. The deflected items of mail 4 then reach the second transport belt 19 of the belt strand 1, which is guided over two deflection rollers 9, 10 and forms an inlet region, in which the deflected items of mail 4 are guided again into the cover belt system having the transport belts 1, 2 arranged close to each other. The magnitude of the deflection of the items of mail 4 is likewise measured with an appropriate measuring means 6 (laser distance sensor), which is located opposite the roller of the deflection apparatus 5, between the supporting roller 8 and the deflection roller 10, at the level of the roller of the deflection apparatus 5. In this case, however, during the determination of the deflection of the items of mail 4, their measured thickness must be taken into account.

Figure 8:
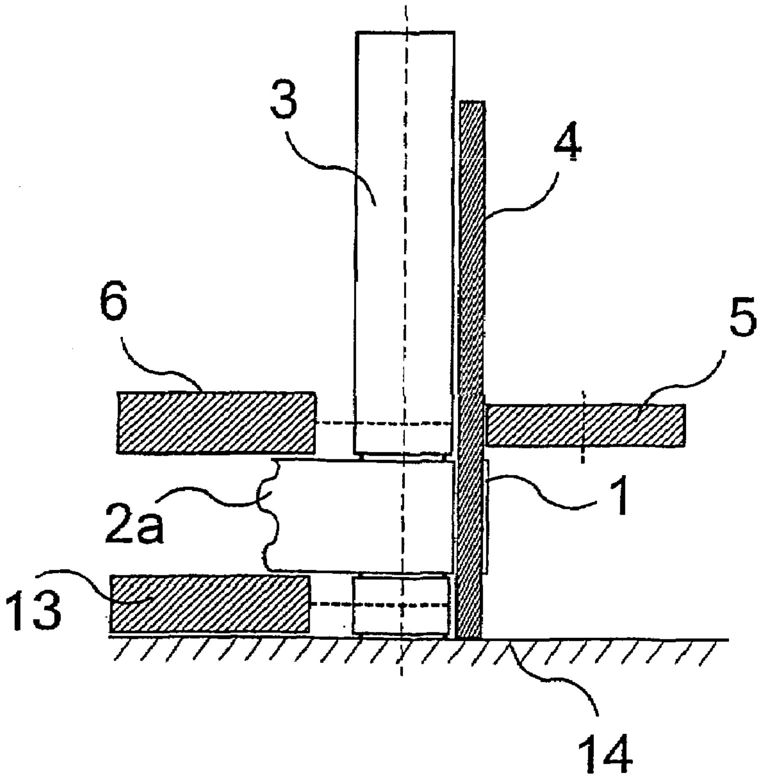
FIG. 8 shows a schematic side view of a measuring apparatus with measurement of the deflection and with two bearing points in the rest position and two distance sensors.

A large number of items of mail 4 comprise periodicals with bound edges. These bound edges have a higher flexural rigidity than the rest of the periodical. The information about the position of the bound edge (at the top or bottom) is important for further processing. For this purpose, a further appropriate measuring means 13 is also arranged a little way above the base plate 14, directly under the first measuring means for determining the magnitude of the deflection (FIG. 8).

Figure 9:
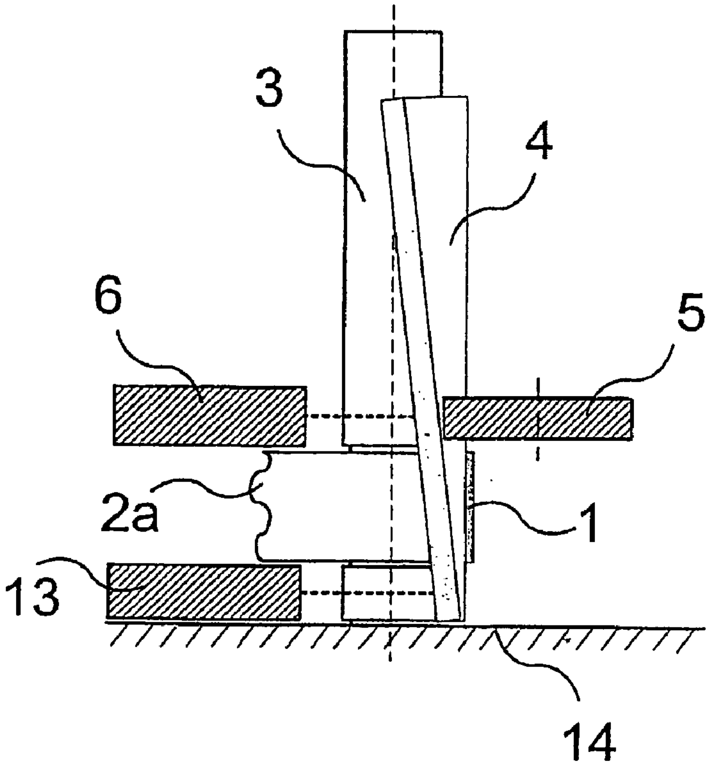
FIG. 9 shows a schematic side view of the measuring apparatus according to FIG. 8 with an item of mail with a bound edge located at the bottom in the measuring position (deflected state)
Figure 10:
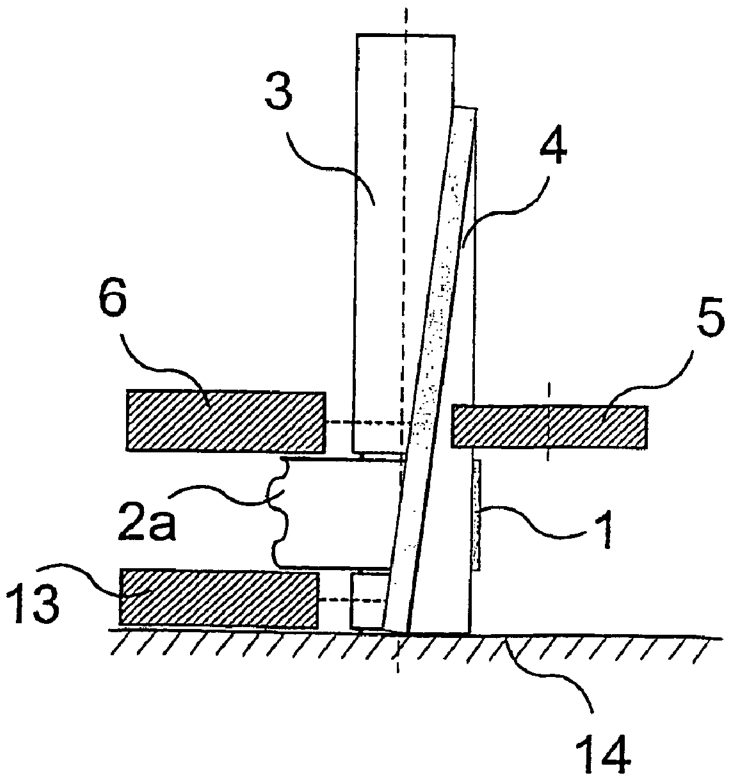
FIG. 10 shows a schematic side view of the measuring apparatus according to FIG. 8 with an item of mail with a bound edge located at the top in the measuring position (deflected state)
Figure 11:
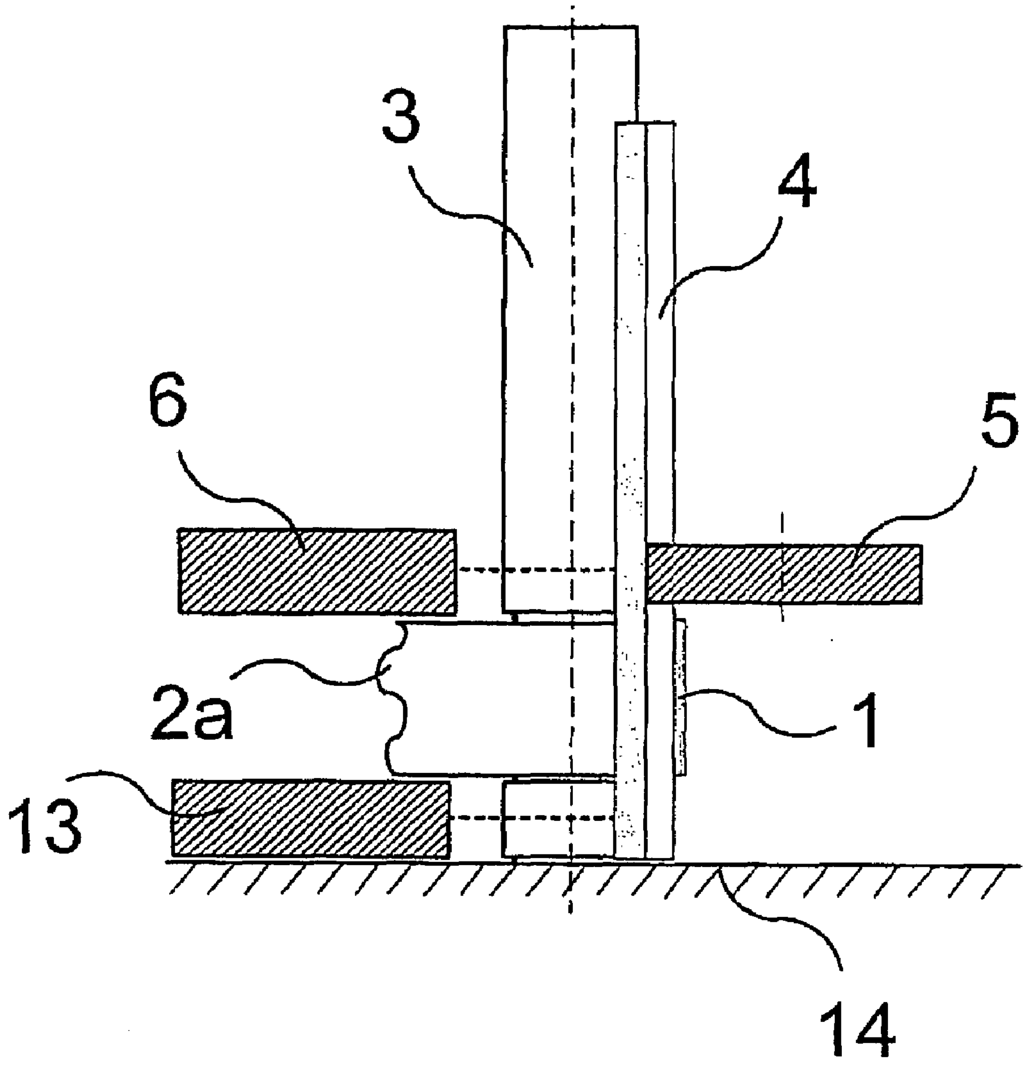
FIG. 11 shows a schematic side view of the measuring apparatus according to FIG. 8 with an item of mail without a bound edge in the measuring position (deflected state).

By using the measured results from the two measuring means 6, 13 (laser distance sensors), it is then possible to decide whether a bound edge is present and, if so, where it is located. If, according to FIG. 9, the bound edge is at the bottom, then, because of the high rigidity, a smaller deflection will be measured there by the measuring means 13 than by the measuring means 6 located above. In FIG. 10, the upper measuring means 6 registers a smaller deflection than the lower measuring means 13, which, as can be seen, identifies an item of mail 4 with a bound edge located at the top. If the deflection is approximately equal on both measuring means 6, 13, there is no bound edge.

The invention claimed is:

1. An apparatus for measuring the flexural rigidity in the longitudinal direction of flat items of mail which are transported one after another on a conveying path, which apparatus has, on the conveying path in a straight section, one bearing point or two bearing points one after another in the transport direction and has, before a rear bearing point in the transport direction and after the one bearing point or a front bearing point in the transport direction, a deflection apparatus that can be moved into the conveying path, approximately perpendicular thereto, in order to bend the items of mail, and which has a sensor detecting the edges of the items of mail and triggering the measuring operation, and also a measuring means for determining the magnitude of the deflection of the items of mail and/or measuring means for determining the magnitude of the deflection force and a control device for driving the deflection apparatus and also for evaluating the sensor and measuring means signals in such a way that the magnitude of the deflection of the items of mail with a defined constant deflection force, or the magnitude of the deflection force for an always identical deflection of the deflection apparatus is used as a measure of the flexural rigidity, the control device, furthermore, being designed such that the deflection apparatus for bending the items of mail is moved into the conveying path as soon as the respective front edge of the item of mail has reached the foremost bearing point in the transport direction or, in the case of only one bearing point has reached the deflection apparatus and remains in the deflected state at most until the rear edge of the item of mail has left the one bearing point, and there being on the conveying path a measuring device, connected to the control device, for determining the thickness of each item of mail, and the deflection apparatus, in the nondeflected state, and/or the bearing points for each item of mail being moved before the start of the respective rigidity measurement such that their distance perpendicular to the transport direction corresponds approximately to the respective thickness of the item of mail.

2. The apparatus as claimed in claim 1, the control device being designed such that the deflection apparatus remains in the deflected state until the rear edge of the item of mail has left the rearmost bearing point and a corresponding rigidity trend is determined.

3. The apparatus as claimed in claim 2, the control device being designed such that only in the event of an inadmissible flexural rigidity measured over a defined length is a separation signal for this item of mail triggered.

4. The apparatus as claimed in claim 1, the measuring means for determining the magnitude of the deflection of the items of mail being arranged at the level of the movable deflection apparatus.

5. The apparatus as claimed in claim 4, a measuring means for determining the magnitude of the deflection of the items of mail additionally being provided at a different height of an item of mail, and the control device being designed such that, in the event of nonuniform deflections determined by the two measuring means, it detects an item of mail with a bound edge and identifies as a bound edge that edge of the item of mail to which the measuring means with the lower deflection is closest.

6. The apparatus as claimed in claim 1, the bearing points and the part of the deflection apparatus that touches the items of mail being designed as rollers.

7. The apparatus as claimed in claim 1, the measuring means for determining the magnitude of the deflection being designed as distance sensors.

8. An apparatus for measuring the flexural rigidity in the longitudinal direction of flat items of mail which are transported one after another on a conveying path of a belt conveyor having at least one bearing point, comprising:

a deflection apparatus that moves into the conveying path to bend individual mail items, the deflection apparatus moving approximately perpendicular to the conveying path in order to bend a leading portion of the item of mail as a rear portion thereof engages the bearing point;

a sensor detecting the edges of the items of mail and triggering the measuring operation;

means for determining one or both of the magnitude of the deflection of the items of mail and the magnitude of the deflection force; and a control device for driving the deflection apparatus and for processing signals from one or both of the sensor and measuring means to determine the flexural rigidity of the mail item, the control device moving the deflection apparatus into the conveying path when the front edge of the item of mail has passed the bearing point in the transport direction.

9. The apparatus of claim 8 further comprising a measuring device prior to the deflection apparatus for determining the thickness of each item of mail, the measuring device being connected to the control device.

10. The apparatus of claim 9 wherein the control device positions the deflection apparatus before the start of the rigidity measurement such that the distance perpendicular to the transport direction corresponds approximately to the respective thickness of the item of mail.

11. The apparatus of claim 8 wherein the deflection apparatus comprises a roller that extends into contact with a side of each item of mail.

12. The apparatus of claim 11 wherein the bearing points comprises rollers forming part of the belt conveyor.

13. The apparatus of claim 8 wherein the means for determining one or both of the magnitude of the deflection of the items of mail and the magnitude of the deflection force comprises a mechanism that determines the magnitude of the deflection of the items of mail with a defined constant deflection force.

14. The apparatus of claim 8 wherein the means for determining one or both of the magnitude of the deflection of the items of mail and the magnitude of the deflection force comprises a mechanism that determines the magnitude of the deflection force for an always identical deflection of the deflection apparatus.

* * * * *